(12) United States Patent
Harvell et al.

(10) Patent No.: US 9,069,720 B2
(45) Date of Patent: *Jun. 30, 2015

(54) PARTIAL OBJECT CACHING

(71) Applicant: Limelight Networks, Inc., Tempe, AZ (US)

(72) Inventors: Bradley B. Harvell, Chandler, AZ (US); Mohan I. Kokal, Peoria, AZ (US); Jason Eggleston, Newport Beach, CA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,616

(22) Filed: Jan. 2, 2013

(65) Prior Publication Data

US 2013/0212208 A1 Aug. 15, 2013

Related U.S. Application Data

(63) Continuation of application No. 13/024,824, filed as application No. PCT/US2010/062142 on Dec. 27, 2010, now Pat. No. 8,370,452.

(30) Foreign Application Priority Data

Feb. 1, 2011 (AU) ................................ 2010276462

(51) Int. Cl.
*G06F 15/167* (2006.01)
*G06F 17/30* (2006.01)

(52) U.S. Cl.
CPC ........ *G06F 15/167* (2013.01); *G06F 17/30902* (2013.01)

(58) Field of Classification Search
CPC .................... G06F 17/30194; G06F 17/30902; H04L 67/10; H04L 67/32
USPC .......................................... 709/213, 217, 229
See application file for complete search history.

(56) References Cited

U.S. PATENT DOCUMENTS

| 8,775,503 | B2* | 7/2014 | Sebastian ...................... 709/203 |
| 2004/0221019 | A1 | 11/2004 | Swildens et al. |
| 2005/0056386 | A1* | 3/2005 | Hicks ............................ 160/199 |
| 2005/0102427 | A1 | 5/2005 | Yokota et al. |
| 2007/0112973 | A1 | 5/2007 | Harris et al. |

(Continued)

OTHER PUBLICATIONS

Supplemental Extended Search Report in European Patent Application No. 10861229.2 mailed on Jun. 10, 2014, 44 pages.

*Primary Examiner* — Hitesh Patel
(74) *Attorney, Agent, or Firm* — Kilpatrick Townsend & Stockton, LLP (57) ABSTRACT

A method of providing media at multiple bit rates using partial object caching may include receiving, from a first user device, a first request for a media object encoded at a first bit rate; providing the first portion of the media object to the first user device; and caching, in a partial object cache, the first portion of the media object. The method may additionally include receiving, from a second user device, a subsequent request for the media object encoded at the first bit rate; providing the first portion of the media object as retrieved from the partial object cache; and receiving a request for the media object encoded at a second bit rate. The method may further include modifying the request for the media object encoded at the second bit rate to instead request a second portion of the media object at the second bit rate.

20 Claims, 4 Drawing Sheets

(56) References Cited

U.S. PATENT DOCUMENTS

| | | |
|---|---|---|
| 2008/0155614 A1 | 6/2008 | Cooper et al. |
| 2009/0100128 A1* | 4/2009 | Czechowski et al. ......... 709/203 |
| 2010/0121940 A1* | 5/2010 | Reeser .......................... 709/219 |
| 2011/0276623 A1* | 11/2011 | Girbal ........................... 709/203 |

* cited by examiner

PARTIAL OBJECT CACHING

PRIORITY

This application is a continuation of U.S. patent application Ser. No. 13/024,824 filed Feb. 10, 2011, which claims priority from co-pending Australian Patent Application No. 2010276462, filed Feb. 1, 2011, entitled "PARTIAL OBJECT CACHING", which claims priority from PCT/U.S.2010/62142, filed Dec. 27, 2010, entitled "PARTIAL OBJECT CACHING". The above-referenced applications are hereby incorporated by reference, as if set forth in full in this document, for all purposes.

BACKGROUND

Presently, an object is requested by a client device, but for various reasons (e.g., a click-off, a connection failure, a bit rate switch, etc.) the entire object is not completely downloaded to the client device. For example, a client may be requesting a video object and the user only views a portion of the video. When this occurs, the incomplete object (e.g., only a partial viewed video) is not able to be cached. Alternatively, the only partially downloaded object may be forced to be completely downloaded in order to cache the object.

Further, content delivery networks (CDNs) cache objects from various web (and other) sources (e.g., objects associated with universal resource locators (URLs)). As a cache fills up, the older cached objects are purged from the cache to free space for fresh cache objects. In addition, either the entire object must be cached or none of the object is cached. Thus, for at least these reasons, improvements in the art are needed.

BRIEF SUMMARY

In one embodiment, partial object caching may include: determining that a current part of a request is cached, then begin delivering the fragment from the cache. Alternatively, if there is currently a fragment being created that would cover the same contiguous un-cached space as this object (due to a request in progress), but has not yet covered the offset, then modifying the other in flight request to stop at the byte just prior to this new fragment. Furthermore, if there is no data cached for this offset, the a request for the portion needed from origin is made and the portion of the object is delivered. Then, if the end of the current fragment is reached, the process is iteratively applied to the remainder of the request.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the figures, similar components and/or features may have the same reference label. In some cases, components of the same type are identified by following a first reference label with a dash and a second reference label that further distinguishes among the similar components. If only the first reference label is used, the description is applicable to any of the similar components designated by the first reference label.

DETAILED DESCRIPTION OF EMBODIMENTS

The ensuing description provides preferred exemplary embodiment(s) only, and such preferred exemplary embodiments are not intended to limit the scope or applicability of the present invention. Rather, the ensuing description will enable those who are skilled in the art to implement such preferred exemplary embodiment(s). Persons of skill in the art will recognize that various changes may be made in the function and arrangement of elements without departing from the spirit and scope of the invention as set forth in the appended claims.

Aspects of the present invention relate to caching a precise partial byte range of an object that an edge server has received. The byte range is of an unspecified amount. Further, each byte range (or partially cached object) may be of different sizes, and multiple partial objects may be concatenated together to form larger partial objects and/or complete objects. As such, future requests may be checked to determine if any part of the request is included in one or more of the partially cached objects; then the request is able to be fulfilled, in whole or in part, by the cached partial objects. Furthermore, each fragment is independently tracked and evicted from the cache. Additionally, such partial object caching may be used to improve caching used for a Flash™ media server, a Windows™ media server, Quicktime™ server, etc.

Some terms in the specification may be defined as follows: 1) request—a portion of an object requested by a client, 2) a fragment—a portion of the object that has previously been cached, and is uniquely evitable as a whole unit by an edge server (this also refers to fragments that are in the process of being created), and 3) an object—for example, an entire http object. In a further embodiment, https may be used.

Figure 1:
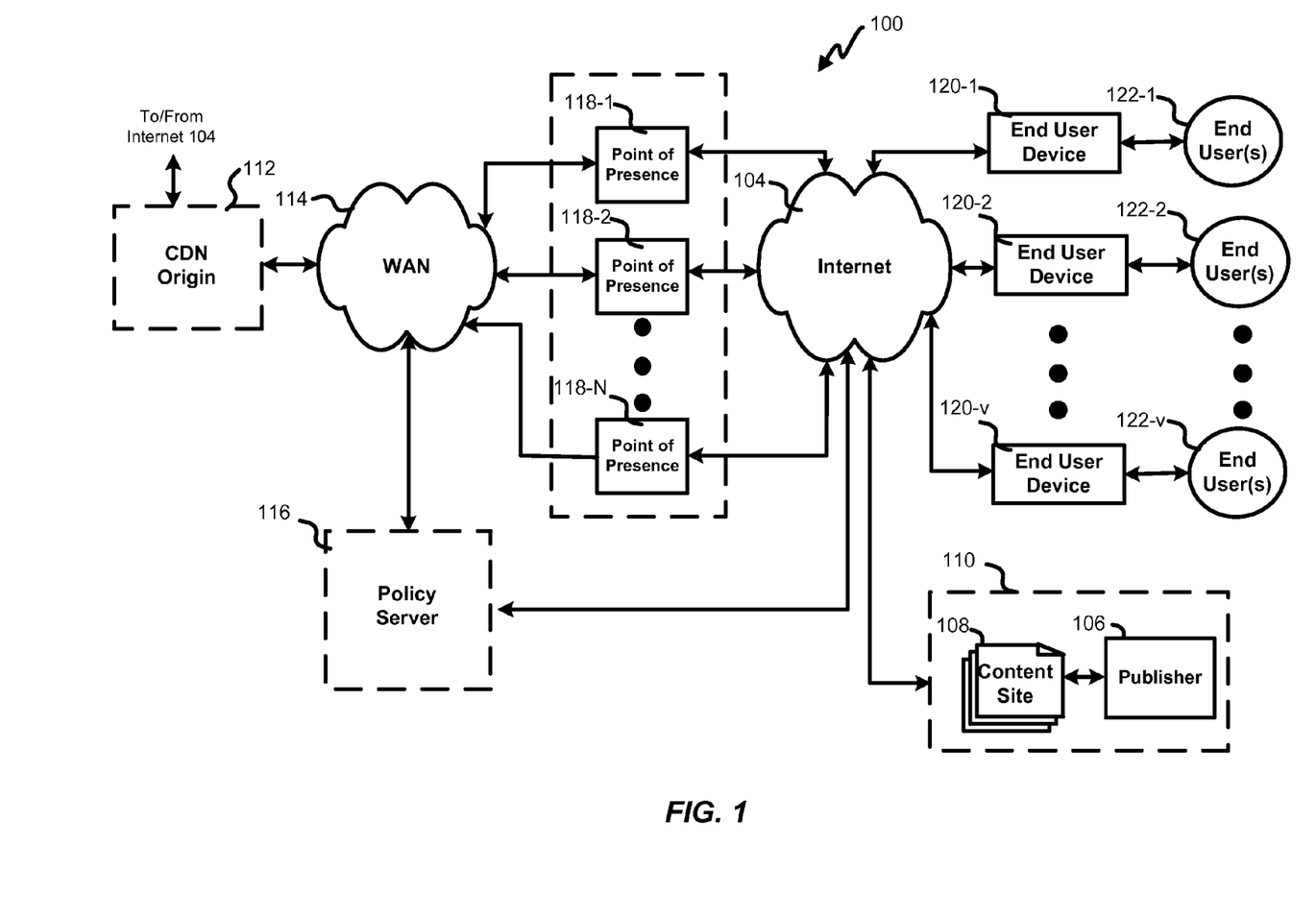
FIG. 1 shows an embodiment of a content distribution system.

Referring first to FIG. 1, a block diagram of an embodiment of a content distribution system 100 is shown in which a content originator 110 offloads delivery of content objects to a content delivery network (CDN). The content originator 110 produces and/or distributes the content objects and may include one or more publishers 106 and content sites 108. The CDN delivers the content objects over the Internet 104 to end users 122 via corresponding end user devices 120.

As shown, the CDN may include an origin server 112, a policy server 116, and various points of presence (POPs) 118. POPs 118 can be deployed throughout content distribution system 100 and may serve content objects to end user devices 120 in a particular geographic area and/or in connection with a particular service provider. For example, a POP 118 may be designated to serve content objects over Internet 104 to end users 122 in a particular city, on a particular access network, etc. to promote efficient delivery and a good user experience. The various CDN elements may be connected by a private network such as WAN 114 and/or a public network such as Internet 104.

An end user 122 may browse for content objects at a content site 108 with its respective end user device 120. As used herein, a content object can be any computer-accessible content and may include audio data, video data, images, etc. in any number of computer-accessible formats. The terms content and content object may be used interchangeably wherever they appear. End user systems 120 can include personal computers, media players, handheld computers, Internet appliances, smart phones, personal digital assistants, streaming radios, or any other device that receives and processes content objects. The content site 108 could be a web page from which content is accessible via a web browser.

Links to content at the content site 108 may point to locations in the content delivery network. When an end user requests delivery of a particular content object, the request may be assigned to a POP 120 which, in turn, can deliver the requested content object to the end user device 120. If the content object is not available at the assigned POP location, the request may be propagated toward the core of the CDN and may ultimately be fulfilled from origin server 112. Content may be cached at various points between the core CDN and edge locations to improve efficiency.

Distribution of content objects often represents an important source of revenue for publishers 106. For example, content sites 108 may generate advertising revenue based on the number of times that a content object is viewed, clicked, or downloaded by end users 122. Thus, to maximize their revenue, publishers 106 may seek to reach as many end users 122 with their content as possible while providing a good overall user experience.

Unfortunately, end user systems 120 can vary widely in their respective capabilities and the manner in which they interact with content objects. Different end user systems 120 may support different collections of multimedia formats and different delivery schemes. For example, beginning with OS version 3.0, the iPhone™ from Apple, Inc. supports M3U8 playlists and MPEG-2 segmented video with iPhone™ HTTP Streaming (IHS) delivery, entirely over HTTP (Hypertext Transfer Protocol). On the other hand, the Blackberry Storm™ from Research in Motion, Ltd. supports playback of multimedia content in Third Generation Partnership Project (3GPP) format, over RTSP (Real-Time Streaming Protocol).

To further complicate matters, the manner in which delivery of a content object is initiated may vary from device to device. For example, some end user devices 120 may need help orchestrating a browser-to-player (B2P) handoff for certain types of content objects. Moreover, even when media formats and delivery methods are equally supported, the manner in which a content object is delivered may depend on the type of connection to Internet 104 available to the end user device 120 at a particular place and time. Thus, for example, the playback capabilities of the Blackberry Storm™ may differ depending upon whether it is connected to the Internet 104 via a WIFI connection in a cybercafé, or via a cellular network in a remote location.

In the present embodiment, policy server 116 is coupled to content site 108 via Internet 104 and receives a notification when new content objects are available from publishers 106. Alternatively, a publisher 106 may upload its content to an origin server 112 and policy server 116 may receive notifications via WAN 114 when a new content object becomes available. Although shown separately, policy server 116 may be located within POPs 118, origin server 112, or other parts of the content delivery network. Also, it will be recognized that the various operations of policy server 116 may be carried out by multiple individual servers such as decisioning servers, merge servers, assembly servers, etc.

When a new content object is ready for processing, policy server 116 determines how it should be made available to end users. This may involve generating a number of different versions of the content object optimized for use with different end user devices 120, having different capabilities, and potentially used in different network environments. The different versions of the content object may correspond to different production or encoding profiles maintained at policy server 116. The production profiles, in turn, may be based upon a publisher's requirements for the distribution of its content objects. For example, a publisher may prefer to distribute its content in a specific media format or formats, to exploit device-specific capabilities (such as IHS streaming for iPhones), to optimize separately for high bitrate and low bitrate environments, to target specific operating systems and/or platforms such as Windows™ or Mac OS, etc.

Policy server 116 may associate the different versions of a content object with a single network identifier such as a uniform resource locator (URL). The single network identifier can then be returned to the publisher 106 which created the content. The publisher 106 can add the network identifier to one or more content sites 108 which are accessible to end users 122. When a request for the content object is received from an end user device, it can be sent to policy server 116 for analysis. Using all available information, policy server 116 can determine a preferred version of the content object for the end user device and can orchestrate its delivery to the requesting end user. The preferred version and delivery method can be customized for hardware and software capabilities of the end user device, bandwidth and connection quality, viewing habits, user preferences, or any combination of factors. The preferred version may also include a selection of advertisements which are matched to information about the end user device and/or the end user.

As described herein, policy server 116 provides publishers 106 with a one-to-many approach to optimized content delivery. Specifically, a single network identifier can point to multiple versions of a given content object from which policy server 116 selects a preferred version for use with a particular end user device. Policy server 116 thus relieves publishers 106 of the burden of staying up-to-date with technology. When a new platform emerges or device capabilities change, appropriate versions of the content object can be made available to end users 122 through an existing network identifier without further effort from the publisher 106. Policy server 116 determines the preferred version of a content object in a manner that is transparent to the end user and thus avoids complicated configuration, specialized software, or manual selection. The end user experience is further improved by selecting a delivery method and sending the preferred version of the content object from a POP 118 location with a fast response time for the user's location, network access, etc.

Figure 2A:
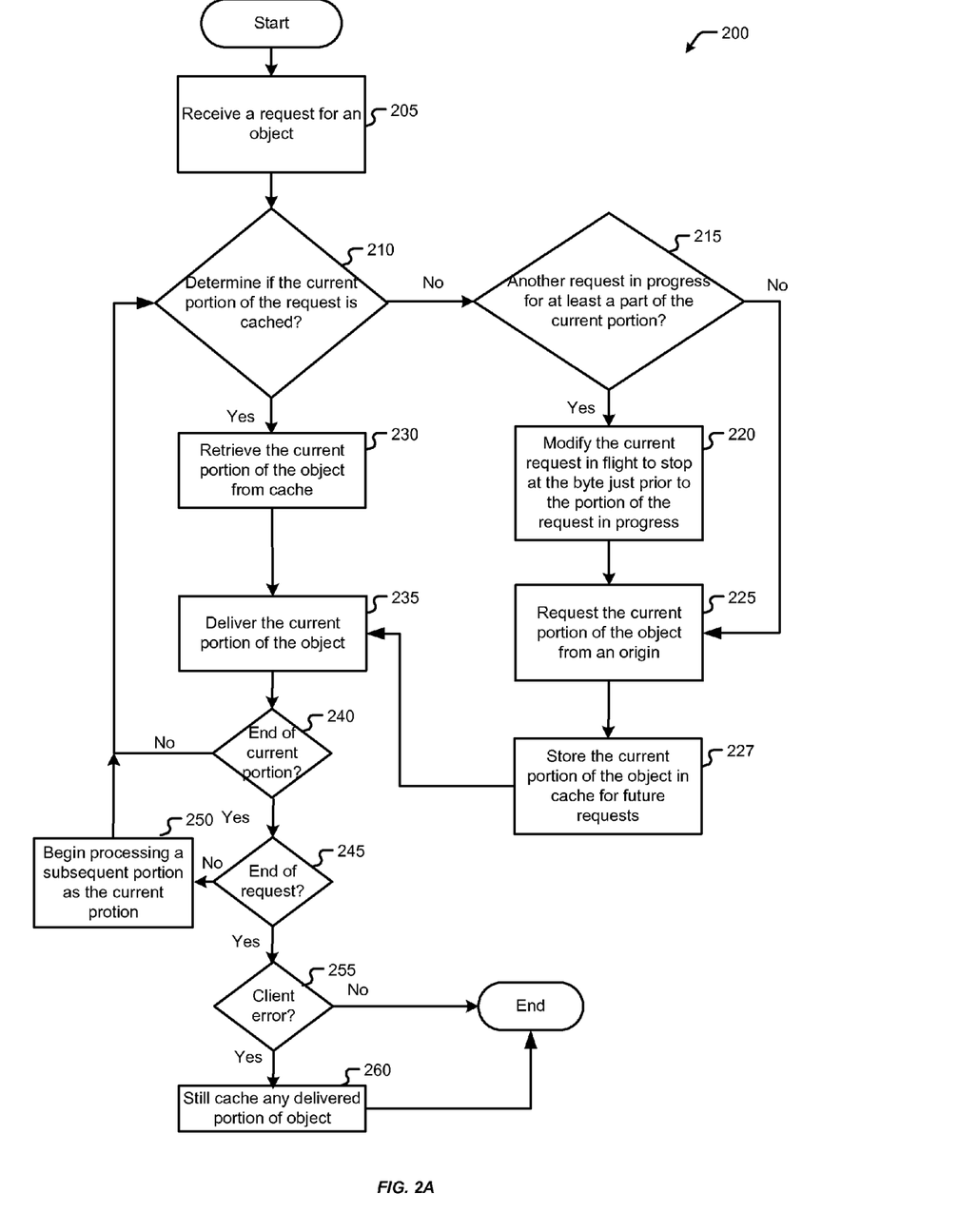
FIGS. 2A and 2B show methods for implemented partial object caching.

FIG. 2A shows an exemplary process 200 for implementing partial object caching such as may be performed by CDN 112. Some or all of partial object caching process 200 may be performed by one or more processors executing fixed or programmable instructions which, in turn, may be stored with related data elements on a computer-readable medium.

At block 205, a request for an object may be received from an end user device. In one embodiment, the cache may be checked to determine if some or all of the requested object is stored in the object cache (decision block 210). Further, the object cache may be stored on an edge server, or the like. Additionally, the object cache may be a hierarchal object cache which allows for some or all of an object to be included at any level of the hierarchy all the way to the object's origin (i.e., the object's content server, neighbor cache, intermediate cache, etc.). Therefore, an object can be retrieved efficiently at any level of the caching hierarchy.

Assuming that the requested object is not included in the object cache, at decision block 215, a determination is made whether another request is in progress for at least part of the currently requested portion. If it is determined that there is a prior request in progress that will later overlap with this new request, then the "prior" request is modified, in flight, to stop at the byte just prior to the portion of the request in progress (process block 220). As such, the current request can utilize the cached portion of the object once the current request has "caught up" to the in progress request. In one embodiment, the request may be flagged, but other designations may be used. It should also be noted that fragments that are "in progress" are also available in the cache, even while still in progress.

Then, at process block 225, the current portion of the object is requested from the origin. Alternatively, if there is no request already in progress for the current portion, then the process moves to process block 225, and the current portion is requested from the origin (or neighbor/intermediate cache) without being modified. At process block 227, the current portion of the object is stored in cache for future requests. It should be noted that this process block could happen in parallel with process block 235 (i.e., delivering the fragment while also storing that same fragment in cache). As such, at process block 235, the current portion of the object is delivered.

Alternatively, if it is determined that the current portion of the object is cached, then at process block 230, the current portion of the object is retrieved form the cache, and then delivered (process block 235). If it is determined that the current portion has not be completely delivered, then the process returned to decision block 210; alternatively, if it is determined that the end of the portion (or fragment) is reached, then at decision block 245, it is determined if the end of the request is reached.

If the end of the request is not reached, then, at process block 250, a subsequent portion is processed as the current portion, and the process moves back to decision block 210. If it is determined that the request has been fulfilled, then at decision block 255, a determination is made whether there has been a client error (e.g., a connection failure, a device failure, a bit rate change, etc.). If there is a client or server error, then any delivered portion of the object is still cached (process block 260). Then, the process ends until another request is received.

In a further embodiment, if, for example, there is an error while receiving content from a web (or intermediate) server, such an error can be seamlessly remedied by attempting the download again from wherever the error occurred. For example, when an attempt is made to re-download the requested object, a restart of the request from the source, a different resource may be used, etc.

In one embodiment, the portion of the object may be a byte range. For example, if the object is 15,000 bytes, then the first portion may be for bytes 1 to 4,356. The range is arbitrarily based, in part, on the amount of data downloaded to the end user device. The user may only desire a portion of the object (e.g., only a clip of a video, a video trailer which only includes the first minute of the movie, etc.); alternatively, the connection may have been interrupted, the user may click-off, etc. As such, an arbitrarily sized portion of the object is retrieved. Accordingly, the current portion of the object (i.e., in the above example, the first 4,356 bytes of the object) may be cached and made available for subsequent requests. Further, an offset and length may be dynamically determined by the state of the object and other connections in progress at the time of writing the partial object in question.

By way of example, a subsequent request for the object may include be for bytes 3,684 to 15,000, thus overlapping with an already cached portion (i.e., bytes 3,684 to 4,356). Therefore, the overlapping byte range (bytes 3,684 to 4,356) is delivered from the cache to the requesting end user device. Then, simultaneously, the remaining bytes (i.e., bytes 4,357 to 15,000) are retrieved from the origin.

This may be particularly useful in certain situations, in which an object (e.g., a video object) may be encoded in different bit rates. This may be necessary to compensate for link conditions, load conditions, payment structures, etc. As such, even though a user is continuing to view the same video object, if during the viewing of the video, the bit rate switches, it is the same as if the user stopped watching one video and began watching another video. Therefore, partially cached objects in different bit rates for the same video objects, using this partial object caching method, may be able to be maintained and presented to end users to increase network efficiency.

In an alternative example, the user A may be requesting an entire object (e.g., 1 gigabyte) and user B may begin requesting the second half (e.g., from 500 megabytes into the object) of the same object at some time later (e.g., 20 seconds later). Assuming that initially none of the object is either fully or partially cached, users A and B are retrieving the object from the origin. Accordingly, as user B requests the second half of the object, the associated bytes are cached in a partial object cache. As such, once user A reached the $500^{th}$ megabyte of the object, the connection between user A and the origin is severed, and user A begins to request the $501^{st}$ megabyte from the cached partial object stored from user B's request.

In a further example, transparent to the user, multiple portions (or fragments) of an object may be concatenated together to form a complete or semi-complete object (in addition to the cached portions, other portions may still be retrieved from the origin). Furthermore, any number of the objects may be stored at any level of a caching hierarchy. Additionally, it should be noted that any number of partial objects of any size may be cached for a given object.

Figure 2B:
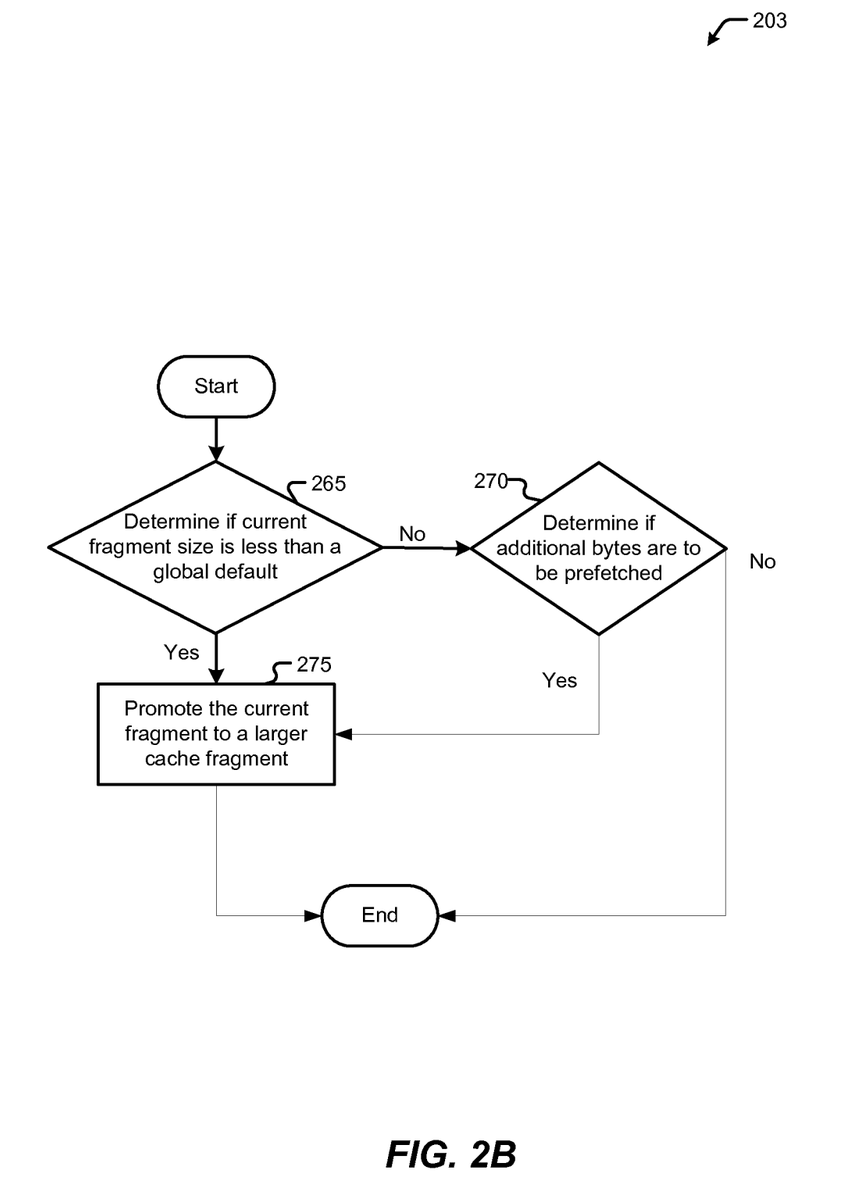

Referring next to FIG. 2B, a determination may be made whether the current fragment size is less than a global default (process block 265). If it is determined that the fragment size is less than the global default, then at process block 275, the fragment may be promoted to a larger cache fragment. This may increase efficiency by because the fragment is larger and also because it is more efficient to keep track of larger fragments.

If it is determined that the fragment size is less than the global default, then at decision block 270, a determination is made whether more bytes should be prefetched. For example, an initial portion of a video may be requested and there is a high probability that based on the initial request, more of the object will be requested. Therefore, the fragment may be promoted to a larger fragment to include the anticipated bytes (process block 275).

In one embodiment, the global default may be set by an administrator or alternatively may be dynamically set based on the network and other condition. The default ultimately acts as a filter to increase the size of fragments to increase efficiency. For example, the default may be set to 100 bytes and so a request for only 3 bytes would be promoted to 100 bytes.

In one embodiment, the partial object cache may be implemented using a linked list structure. The linked list may be configured to connect each of the partial objects together for a given object. The head of the linked list may be identified by, for example, the URL with links to the object. The linked list allows for a partial object to be easily and efficiently inserted and deleted from the list. For example, if partial object A is linked to partial object B which is in turn linked to partial object C, then partial object B' can be simply inserted into the linked list by changing partial object B's head tail pointer to point at partial object B' and partial object B"s tail pointer to point to partial object C's head pointer.

Similarly, if partial object B is to be deleted, then this can be achieved by changing partial object A's tail pointer to point to partial object C's each pointer. Furthermore, such a configuration provides for the ability to quickly search by URL and then further search by each partial object for the URL. Further, if a URL and its associated content are requested to be purged from an end user device, a server, etc., then the URL's linked list can be de-allocated to remove any trace of the URL.

Additionally, the nodes within the linked list may be located at any level of the server hierarchy. Thus, some of the nodes in the linked list may point to other nodes which are located on a different server. Additionally, a hash of the URLs may be used to subdivide the URLs into smaller more manageable buckets. The hash of the URL points the system to the bucket which includes the desired URL. For example, there may be 100,000,000 URLs, but each bucket may only contain 1,000 URLs. As such, the search time for the URL is decreased significantly.

In alternative embodiments, a heap or a tree structure may be used, as opposed to the linked list structure. The tree structure may provide faster lookup speeds and also make adding or removing partial objects from the cache easier, but nonetheless may utilize more memory and resources than the linked list. As such, when look-up speed is particularly important (e.g., for data files, web browsing, etc.) a tree structure may be more advantageous. Whereas, when lookup speed is less important (e.g., for video file rendering), a linked list may be more appropriate. Thus, in one embodiment, the data structure used (linked list, tree, heap, etc.) may be dynamically changed based in part on the type of data being cached in the partial object cache.

Furthermore, it should be noted that partial objects may be cached based on received data as well as requested data. For example, if an end user device received X amount of bytes of an object, those bytes may be cached; however, if X amount of bytes of an object are requested, but never received, the X number of bytes of the object may still be cached.

Additionally, content cached from multiple users may be stored on the same server. For example, user A may have requested the first half of an audio object and user B may have requested the second half on the audio object. As such, the entire audio object may be cached in two partial objects which each came via a different user's request. Accordingly, a patchwork of cached partial objects may be stitched together from multiple sources to allow for the most bytes to be cached.

Furthermore, a portion of the object may be cached at the CDN edge server 112. Subsequently, a portion of the object may be requested from the end user device 120, or alternatively from another end user device, and so a request to the content site 108 is made. Accordingly, the CDN edge server 112 caches a partial object for the bytes in the subsequent portion of the object which are not included in the previously cached partial object from the initial request. Accordingly, portion of the object form the subsequent request does not overlap which the initial portion which is already cached.

Furthermore, each of the cached fragments are independently maintained within the cache. For example, if the first two minutes of a video file are used as the trailer for the video, then the portion of the video object which corresponds to the first two minutes of the video will likely be requested much more than the rest of the video objects (due in part to the fact that many users may view the trailer, but not decide to view the entire movie). As such, instead of either caching the entire object in one cached video object, the "trailer" (or first two minutes of the video object) can be cached, and the rest of the video object can be cached in a separate object.

As such, the "trailer" cached object will remain in the cache longer, than the rest of the video object. Thus, if, for example, the trailer for a video is commonly viewed, but the move is rarely watched, then the cache space is not wasted by maintaining an entire video file when only a small portion of the video file is actually being used.

Figure 3:
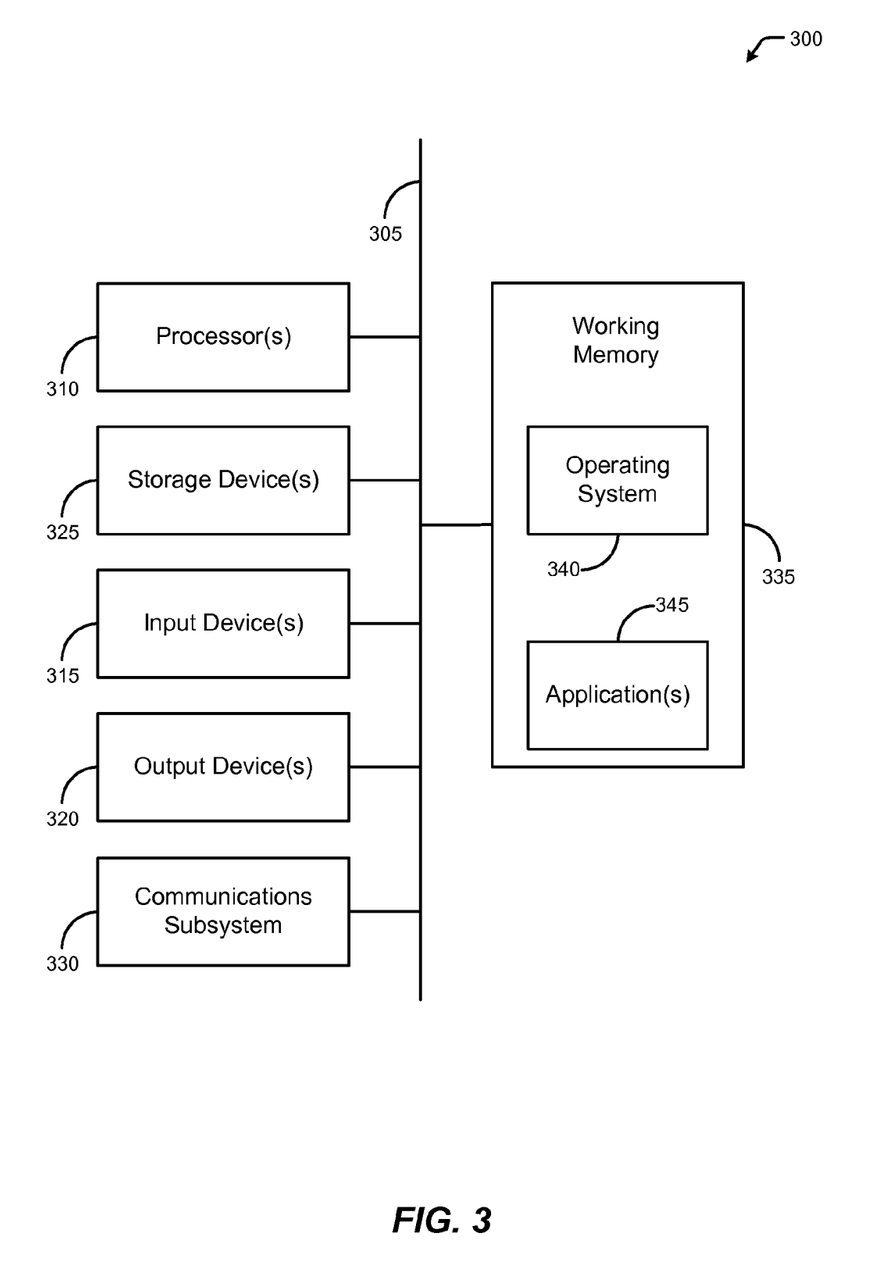
FIG. 3 shows an embodiment of a computer system.

FIG. 3 provides a schematic illustration of one embodiment of a computer system 300 that can perform the methods of the invention, as described herein. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements can include one or more processors 310, including without limitation, one or more general purpose processors and/or one or more special purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 300 might also include a communications subsystem 330, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), and/or any other devices described herein. In many embodiments, the computer system 300 will further comprise a working memory 335, which can include a RAM or ROM device, as described above.

The computer system 300 also can comprise software elements, shown as being currently located within the working memory 335, including an operating system 340 and/or other code, such as one or more application programs 345, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.), then takes the form of executable code. In one embodiment, the computer or machine-readable medium may be non-transitory.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 300) to perform methods of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another machine-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 300, various machine-readable media might be involved in providing instructions/code to processor (s) 310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 325. Volatile media includes, without limitation, dynamic memory, such as the working memory 335. Transmission media includes coaxial cables, copper wire and fiber optics, including the wires that comprise the bus 305, as well as the various components of the communications subsystem 330 (and/or the media by which the communications subsystem 330 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc., carried by the signals) to the working memory 335, from which the processor(s) 310 retrieves and executes the instructions. The instructions received by the working memory 335 may optionally be stored on a storage device 325 either before or after execution by the processor(s) 310.

As will be understood by those skilled in the art, the present invention may be embodied in other specific forms. In one particular embodiment of the partial object cache, as previously described, can be associated with a plurality of versions of programming structures. Those skilled in the art will recognize, or be able to ascertain using no more than routine experimentation, many equivalents to the specific embodiments of the invention described herein. Such equivalents are intended to be encompassed by the following claims.

What is claimed is:

1. A method of providing media at multiple bit rates using partial object caching, the method comprising:
   receiving, at a content delivery network (CDN) from a first user device, a first request for a media object encoded at a first bit rate;
   retrieving a first portion of the media object from a CDN server, wherein the first portion of the media object is encoded at the first bitrate;
   providing the first portion of the media object to the first user device;
   caching, in a partial object cache, the first portion of the media object;
   receiving, at the CDN from a second user device, a subsequent request for the media object encoded at the first bit rate;
   providing the first portion of the media object to the second user device, wherein the first portion of the media object is retrieved from the partial object cache;
   receiving, from the second user device during playback of the first portion of the media object, a request for the media object encoded at a second bit rate; and
   modifying the request for the media object encoded at the second bit rate to instead request a second portion of the media object at the second bit rate, wherein the second portion of the media object follows the first portion of the media object during playback on the second user device.

2. The method of providing media at multiple bit rates using partial object caching of claim 1, wherein the media object is chunked by the CDN server to generate chunks of the media object, and wherein the first portion of the media object and the second portion of the media object represent portions of the media object having sizes smaller than a size of the chunks of the media object.

3. The method of providing media at multiple bit rates using partial object caching of claim 1, wherein the first portion of the media object and the second portion of the media object represent chunks of the media object, wherein the media object is chunked by the CDN server.

4. The method of providing media at multiple bit rates using partial object caching of claim 1, wherein the media object comprises a video file.

5. The method of providing media at multiple bit rates using partial object caching of claim 1, wherein the media object comprises a music file.

6. The method of providing media at multiple bit rates using partial object caching of claim 1, further comprising caching the second portion of the media object in the partial object cache.

7. The method of providing media at multiple bit rates using partial object caching of claim 6, further comprising:
- receiving, at the CDN from a third user device, a subsequent request for the media object encoded at the first bit rate;
- providing the first portion of the media object to the third user device, wherein the first portion of the media object is retrieved from the partial object cache;
- receiving, from the third user device during playback of the first portion of the media object, a request for the media object encoded at a second bit rate; and
- providing the second portion of the media object to the third user device, wherein the second portion of the media object is retrieved from the partial object cache.

8. The method of providing media at multiple bit rates using partial object caching of claim 1, wherein the partial object cache is located on an edge server in the CDN.

9. The method of providing media at multiple bit rates using partial object caching of claim 1, wherein:
- the partial object cache comprises a cache hierarchy; and
- the cache hierarchy is configured to store the first portion of the media object and the second portion of the media object at different levels of the cache hierarchy.

10. The method of providing media at multiple bit rates using partial object caching of claim 9, wherein each level of the cache hierarchy moves upstream to an origin of the media object.

11. An edge server in a content delivery network (CDN) for providing media at multiple bit rates using partial object caching, the edge server comprising:
- one or more processors;
- one or more memories having stored thereon instructions that cause the one or more processors to:
  - receive, from a first user device, a first request for a media object encoded at a first bit rate;
  - receive a first portion of the media object from a CDN server, wherein the first portion of the media object is encoded at the first bitrate;
  - provide the first portion of the media object to the first user device; cache, in a partial object cache, the first portion of the media object; receive, from a second user device, a subsequent request for the media object encoded at the first bit rate;
  - provide the first portion of the media object to the second user device, wherein the first portion of the media object is retrieved from the partial object cache;
  - receive, from the second user device during playback of the first portion of the media object, a request for the media object encoded at a second bit rate; and
  - modify the request for the media object encoded at the second bit rate to instead request a second portion of the media object at the second bit rate, wherein the second portion of the media object follows the first portion of the media object during playback on the second user device.

12. The edge server in the CDN for providing media at multiple bit rates using partial object caching of claim 11, wherein the media object is chunked by the CDN server to generate chunks of the media object, and wherein the first portion of the media object and the second portion of the media object represent portions of the media object having sizes smaller than a size of the chunks of the media object.

13. The edge server in the CDN for providing media at multiple bit rates using partial object caching of claim 11, wherein the first portion of the media object and the second portion of the media object represent chunks of the media object, wherein the media object is chunked by the CDN server.

14. The edge server in the CDN for providing media at multiple bit rates using partial object caching of claim 11, wherein the media object comprises a video file.

15. The edge server in the CDN for providing media at multiple bit rates using partial object caching of claim 11, wherein the media object comprises a music file.

16. The edge server in the CDN for providing media at multiple bit rates using partial object caching of claim 11, wherein the instructions further cause the one or more processors to cache the second portion of the media object in the partial object cache.

17. The edge server in the CDN for providing media at multiple bit rates using partial object caching of claim 16, wherein the instructions further cause the one or more processors to:
- receive, from a third user device, a subsequent request for the media object encoded at the first bit rate;
- provide the first portion of the media object to the third user device, wherein the first portion of the media object is retrieved from the partial object cache;
- receive, from the third user device, a request for the media object encoded at a second bit rate; and
- provide the second portion of the media object to the third user device, wherein the second portion of the media object is retrieved from the partial object cache.

18. The edge server in the CDN for providing media at multiple bit rates using partial object caching of claim 11, wherein:
- the partial object cache comprises a cache hierarchy; and
- the cache hierarchy is configured to store the first portion of the media object and the second portion of the media object at different levels of the cache hierarchy.

19. The method of providing media at multiple bit rates using partial object caching of claim 18, wherein each level of the cache hierarchy moves upstream to an origin of the media object.

20. A method of providing media at multiple bit rates using partial object caching, the method comprising:
- caching, in a partial object cache, a first portion of a media object, wherein the first portion of the media object is encoded at a first bitrate;
- caching, in the partial object cache, a second portion of the media object, wherein the second portion of the media object is encoded at a second bitrate;
- receiving, from a user device, a subsequent request for the media object encoded at the first bit rate;
- providing the first portion of the media object to the user device, wherein the first portion of the media object is retrieved from the partial object cache;
- receiving, from the user device, while first portion of the media object is being played by the user device, a request for the media object encoded at a second bit rate; and
- providing the second portion of the media object to the user device, wherein the second portion of the media object is retrieved from the partial object cache;

modifying the request for the media object encoded at the second bit rate to instead request a third portion of the media object at the second bit rate, wherein the third portion of the media object follows the second portion of the media object during playback on the user device.

* * * * *